(12) United States Patent
Tamaru (10) Patent No.: US 7,054,047 B2
(45) Date of Patent: May 30, 2006

(54) POLYGON MIRROR AND OPTICAL SCANNING DEVICE HAVING THE SAME

(75) Inventor: Yasuo Tamaru, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 227 days.

(21) Appl. No.: 10/759,089

(22) Filed: Jan. 20, 2004

(65) Prior Publication Data

US 2004/0145791 A1    Jul. 29, 2004

(30) Foreign Application Priority Data

Jan. 29, 2003    (JP)    ............... 2003-020733

(51) Int. Cl.
*G02B 26/08*    (2006.01)

(52) U.S. Cl. ..................... 359/216; 347/261

(58) Field of Classification Search ........ 359/216–219; 347/243, 259–261
See application file for complete search history.

(56) References Cited

U.S. PATENT DOCUMENTS 5,151,586 A    9/1992    Sato et al.

FOREIGN PATENT DOCUMENTS

| JP | A 4-106516 | 4/1992 |
| JP | A 5-289011 | 11/1993 |
| JP | A 7-84201 | 3/1995 |
| JP | A 7-199106 | 8/1995 |
| JP | A 11-295633 | 10/1999 |

*Primary Examiner*—James Phan
(74) *Attorney, Agent, or Firm*—Oliff & Berridge, PLC (57) ABSTRACT

A polygon mirror including a plurality of reflection surfaces. Each reflection surface has a writing region and two non-writing regions. The writing region includes a first reflecting section and a second reflecting section positioned downstream of the first reflecting section in a rotating direction of the polygon mirror. One non-writing section is positioned at an upstream end of each reflecting surface, and the other non-writing region is positioned at a downstream end of each reflecting surface. The first reflecting section has a reflection factor higher than a second reflection factor of the second reflecting section. A foggy region appears in the first reflecting section.

22 Claims, 6 Drawing Sheets

POLYGON MIRROR AND OPTICAL SCANNING DEVICE HAVING THE SAME

BACKGROUND OF THE INVENTION

The present invention relates to a polygon mirror having a plurality of reflection surfaces for reflecting an optical beam, and to an optical scanning device provided with the polygon mirror. The present invention also relates to an image forming device provided with the optical scanning device.

In a conventional image forming device such as a printer, a facsimile and a copying machine, an optical scanning device is incorporated for scanningly irradiating a light beam onto a photosensitive drum for forming an electrostatic latent image thereon. The optical scanning device includes a polygon mirror having a plurality of light reflection surfaces.

Japanese Patent Application Publication Nos. Hei 7-199106 and Hei-11-295633 disclose a polygon mirror in which each light reflection surface has a writing region for reflecting light beam available for forming the electrostatic latent image and a non-writing region for reflecting light beam not available for forming the electrostatic latent image.

In the JP Publication No. Hei-7-199106, attention is drawn to a local degradation of the electrostatic latent image by a weakened power of the optical beam reflected at a specific region of each light reflection surface of the polygon mirror. That is, a fog is generated at the specific region, and the power of the light beam reflected at the specific region becomes lower than a predetermined light beam power. To avoid this problem, in the JP publication, the non-writing region is set at the specific region where the fog is generated. Accordingly, the optical beam reflected at the specific region becomes unavailable for the formation of the electrostatic latent image.

However, because the foggy region is not utilized for forming the electrostatic latent image, each reflection surface must have an increased area in order to provide an increased area of the writing region. Consequently, resultant polygon mirror becomes bulky, which in turn renders the optical scanning device and the image forming device also bulky.

In the JP publication No. Hei-11-295633, a light reflectivity of the non-writing region is set higher than that of the writing region in each reflection surface. With this structure, if a fog generation area is within the writing region, a resultant electrostatic latent image has a degraded imaging region formed by the optical beam reflected at the fog generating area. Thus, resultant visible image is also partly degraded.

SUMMARY OF THE INVENTION

It is therefore an object of the present invention to provide a polygon mirror having a compact size yet capable of avoiding a partial degradation of an electrostatic latent image.

This and other objects of the present invention will be attained by providing a polygon mirror rotatable about its axis in a rotating direction for use in an image forming device including a photosensitive body. The polygon mirror includes a plurality of reflection surfaces at which a light beam is reflected toward the photosensitive body. Each reflection surface includes a writing region available for forming an electro-static latent image on the photosensitive body and a non-writing region unavailable for forming the electrostatic latent image. The writing region is divided into a first reflecting section having a first reflection factor and a second reflecting section having a second reflection factor lower than the first reflection factor.

In another aspect of the invention, there is provided an optical scanning device for use in an image forming device including a photosensitive body and an optical scanning unit. The optical scanning unit includes a light beam emitting unit for emitting a light beam, the polygon mirror for reflecting the light beam emitted from the light beam emitting unit, and a driving unit for rotating the polygon mirror about its axis.

In still another aspect of the invention, there is provided an image forming device for forming an image on an image recording medium including an image forming unit, and the optical scanning device. The image forming unit includes a photosensitive body on which an electrostatic latent image is formed.

DETAILED DESCRIPTION OF THE PREFERRED EMBODIMENTS

A printer incorporating a scanner unit having a polygon mirror according to a first embodiment of the present invention will be described with reference to FIGS. 1 through 6. First, overall structure of the laser printer 1 will be described with reference to FIG. 1.

Figure 1:
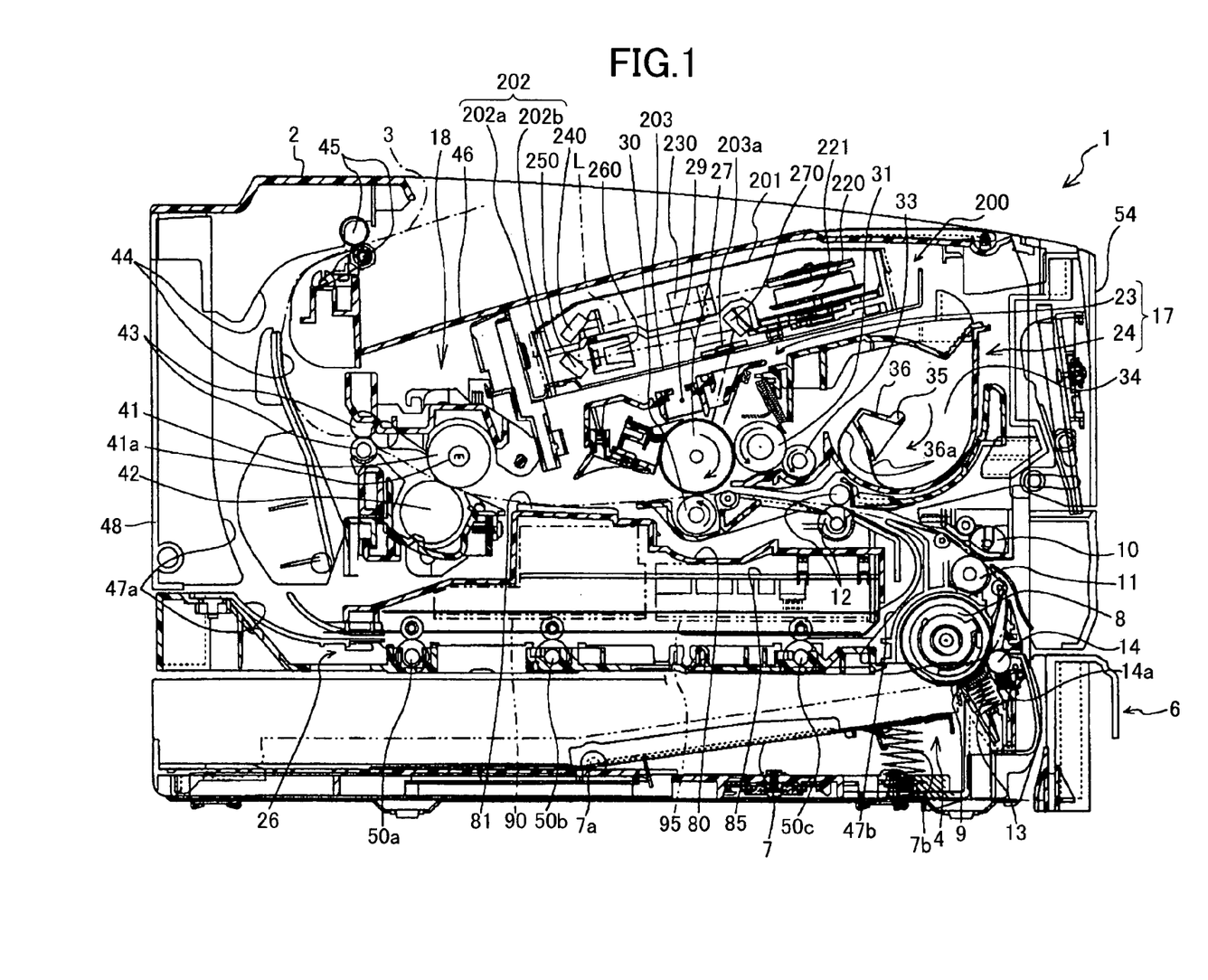
FIG. 1 is a cross-sectional view of a laser printer incorporating a scanner unit according to one embodiment of the present invention.

As shown in FIG. 1, the laser printer 1 includes a feeder section 4, and an image forming section, all accommodated in a main body case 2. The feeder section 4 is adapted for feeding sheets 3. The image forming section is adapted for forming an image on each fed sheet 3, and includes a scanner unit 200 provided with a polygon mirror 220, a process cartridge 17, and a fixing unit 18. Note that the right side of FIG. 1 is the front side of the laser printer 1.

A sheet discharge tray 46 is formed at an upper central and relatively frontward portion of the main body 2 in a form of a recess. A bottom of the sheet discharge tray 46 is inclined upwardly toward the front side of the main body 2 and is bent so that the inclination is reduced toward the front side of the main body 2. The printed sheets 3 can be discharged onto the bottom of the sheet discharge tray 46 in a stacked manner. A space that holds a process cartridge 17 is provided in a portion close to the front upper surface of the main body case 2. The space is open to the front side so that the process cartridge 17 can be inserted thereinto. A cover 54 that pivots downward is provided on a right end side (front side) of the main body case 2 for covering the space. A process cartridge 17 is inserted and removed where the cover 54 is opened widely.

A sheet discharge path 44 is provided at the rear part in the main body case 2 (left side in FIG. 1). The sheet discharge path 44 is formed in a semi-circular shape that extends vertically along the back of the main body case 2. The sheet discharge path 44 delivers the sheet 3 from the fixing device 18 which is provided on a rear end side in a lower part of the main body case 2 to the sheet discharge tray 46, which is provided on an upper part of the main body case 2. A sheet discharge roller 45 for discharging the sheet 3 onto the tray 46 is provided along the sheet discharge path 44.

The feeder section 4 will be described in detail. The feeder section 4 includes a sheet supply tray 6, a sheet supply roller 8, a sheet pressing plate 7, a separation pad 9, a paper dust removing rollers 10, 14, a conveying roller 11, and registration rollers 12. The sheet supply tray 6 is mounted on the main body case 2 and detachable from the front side thereof. The sheet supply tray 6 is pulled forward to remove the sheet supply tray 6 from the main body case 2 and pushed rearward to mount onto the main body case 2. The sheet supply roller 8 is positioned at a bottom portion of the main body case 2 for supplying each one of the sheets 3. The sheet pressing plate 7 is disposed in the sheet supply tray 6. The sheet pressing plate 7 is adapted for holding a stack of sheets 3 and is biased toward the sheet supply roller 8.

The sheet pressing plate 7 has a remote end away from the sheet supply roller 8 and a proximity end close to the sheet supply roller 8. The remote end is pivotally connected to a bottom section of the sheet supply tray 6 so that the proximity end is movable toward and away from the sheet supply roller 8. A coil spring 7b is interposed between the bottom of the sheet supply tray 6 and a bottom surface of the sheet pressing plate 7 for normally urging the proximity end toward the sheet supply roller 8. With this arrangement, the sheet pressing plate 7 is pivotally moved downward in accordance with an increase in sheet stacking amount against the biasing force of the coil spring 7b.

The separation pad 9 is positioned at an upper end portion of the sheet supply tray 6 and in confrontation with the sheet supply roller 8. The separation pad 9 is biased toward the sheet supply roller 8 by a coil spring 13 for separating a sheet from remaining sheets of the sheet stack in cooperation with the sheet supply roller 8.

The paper dust removing roller 14 is positioned downstream of the separation pad 9 and in nipping relation with the sheet supply roller 8. Further, a sponge 14a is disposed in contact with the paper dust removing roller 14 at a position opposite to the sheet supply roller 8 with respect to the paper dust removing roller 14. Thus, paper dust generated due to the frictional contact of the sheet 3 with the separation pad 9 is electrostatically absorbed into the paper dust removing roller 14, and then trapped or wiped off by the sponge 14a.

The conveying roller 11 is disposed downstream of the sheet supply roller 8 in the sheet feeding direction for feeding the sheet picked up by the sheet supply roller 8. The paper dust removing roller 10 is disposed in nipping relation to the conveying roller 11 for removing paper dust from the sheet 3, and for transferring the sheet 3 in cooperation with the conveying roller 11. Paper dust which have not been removed by the paper dust removing roller 14 can be removed by the paper dust removing roller 10, thereby preventing paper dust from entering the image forming section. The register rollers 12 are positioned downstream of the conveying roller 11 in the sheet feeding direction for regulating sheet feeding timing to the image forming section.

Next, a double side printing unit 26 will be described. The double side printing unit 26 is disposed above the paper supply cassette 6 and includes reverse conveying rollers 50a, 50b, and 50c arranged in a substantially horizontal orientation. A reverse conveying path 47a is provided on the rear side of the reverse conveying roller 50a and a reverse conveying path 47b is provided on the front side of the reverse conveying roller 50c. The reverse conveying path 47a is formed in the inside of a backward cover 48, and extends from a pair of discharge rollers 45 to the reverse conveying rollers 50a and branches from an upstream end of a discharge path 44. The reverse conveying path 47b, on the other hand, extends from the reverse conveying roller 50c to the register rollers 12.

When performing double side printing, first an image is formed on one side of the sheet 3. Then a leading end portion of the sheet 3 is discharged onto the discharge tray 46. When the trailing edge of the sheet 3 becomes interposed between the discharge rollers 45, the discharge rollers 45 stop rotating forward and begin rotating in reverse. At this time, the trailing edge of the sheet 3 contacts the arched surface of the discharge path 44 and is guided along the arched surface to the reverse conveying path 47a, without returning to the fixing unit 18. The sheet 3 is conveyed from the reverse conveying path 47a to the reverse conveying rollers 50a, 50b, and 50c and is subsequently guided to the register rollers 12 along the reverse conveying path 47b. According to this operation, the sheet 3 is conveyed to the image forming unit with its front and back surfaces switched in order to form an image on the other side of the sheet 3.

A low-voltage power source circuit board 90, a high-voltage power source circuit board 95, and an engine circuit board 85 are provided between the double side printing unit 26 and the image forming unit. A chute 80 is disposed between these circuit boards 90, 95, and 85 and the image forming unit for separating these circuit boards 90, 95, 98 from the fixing unit 18, the processing cartridge 17, and other devices. A guiding plate 81 is provided on the top of the chute 80 for guiding the sheet 3. The guiding plate 81 forms a portion of the conveying path for the sheet 3. The chute 80 is bridged between lateral frames. Various components of the laser printer 1 are supportedly held between the lateral frames.

The low-voltage power source circuit board 90 functions to drop the voltage supplied from a source external to the laser printer 1, such as a single-phase 100V source, to a voltage of 24V, for example, to be supplied to components in the laser printer 1. The high-voltage power source circuit board 95 generates a high-voltage bias that is applied to components in the processing cartridge 17. The engine circuit board 85 drives a DC motor (not shown) and a solenoid (not shown). The DC motor is the source for driving parts involved in mechanical operations, such as the rollers in the laser printer 1. The solenoid (not shown) is adapted for switching the operating direction of this drive system, for example the solenoid perform change-over operation between rotation and stopping operation of the registration roller 12.

The process cartridge 17 includes a drum cartridge 23 and a developing cartridge 24 that is detachably mounted on the drum cartridge 23. The drum cartridge 23 includes a photosensitive drum 27, a scorotron charger 29, and a transfer roller 30. The developing cartridge 24 includes a developing roller 31, a toner supply roller 33, and a toner hopper 34.

The photosensitive drum 27 is arranged in the drum cartridge 23 so as to contact the developing roller 31. The photosensitive drum 27 is rotatable clockwise as indicated by an arrow in FIG. 1. The photosensitive drum 27 includes a conductive base and a positively charging organic photosensitive body coated on the conductive base. The positively charging organic photosensitive body is made from a charge transfer layer dispersed with a charge generation material. When the photosensitive drum 27 is exposed to a laser beam, the charge generation material absorbs the light and generates a charge. The charge is transferred onto the surface of the photosensitive drum 27 and the conductive base through the charge transfer layer and counteracts the surface potential charged by the scorotron charger 29. As a result, a potential difference is generated between regions of the photosensitive drum 27 that were exposed to laser beam and regions that were not exposed to the laser beam. By selectively exposing and scanning the surface of the photosensitive drum 27 with a laser beam based upon image data, an electrostatic latent image is formed on the photosensitive drum 27.

The Scorotron charger 29 is disposed above the photosensitive drum 27. The Scorotron charger 29 is separated from and out of contact from the photosensitive drum 27 by a predetermined distance. The Scorotron charger 29 generates a corona discharge from a wire made from tungsten, for example, and is turned ON by a charging bias circuit unit (not shown) of the high-voltage power source 95 for charging the surface of the photosensitive drum 27 to a uniform charge of positive polarity.

The developing roller 31 is disposed downstream of the scorotron charger 29 with respect to the rotation direction of the photosensitive drum 27, and is rotatable in the counter-clockwise as indicated by an arrow in FIG. 1. The developing roller 31 includes a roller shaft made from metal and a roller covered over the roller shaft. The roller is made from a conductive rubber material. A development bias is applied to the developing roller 31 from a development bias circuit unit (not shown) of the high-voltage power source 95.

The toner supply roller 33 is rotatably disposed beside the developing roller 31 on the opposite side from the photosensitive drum 27 across the developing roller 31. The toner supply roller 33 is in pressed contact with the developing roller 31. The toner supply roller 33 includes a roller shaft made of metal and a roller disposed over the roller shaft. The roller is made of a conductive foam material and is adapted to triboelectrify the toner to be supplied to the developing roller 31. To this effect, the toner supply roller 33 is rotatable counterclockwise as indicated by an arrow in FIG. 1. This is the same rotation direction as developing roller 31.

The toner hopper 34 is provided beside the toner supply roller 33. The inside of the toner hopper 34 is filled with developer to be supplied to the developing roller 31 by way of the toner supply roller 33. In this embodiment, non-magnetic, single-component toner with a positive charging nature is used as a developer. The toner is a polymeric toner obtained by co-polymerizing polymeric monomers using a well-known polymerization method such as suspension polymerization. Examples of polymeric monomers include styrene monomers and acrylic monomers. Styrene is an example of a styrene monomer. Examples of acrylic monomers include acrylic acid, alkyl (C1 to C4) acrylate, and alkyl (C1 to C4) methacrylate. A coloring agent, such as carbon black, and wax are mixed in the polymeric toner. An external additive such as silica is also added in order to improve fluidity. Particle diameter of the external additive is approximately 6 to 10 μm.

An agitator 36 is provided for agitating toner accommodated in the toner hopper 34 and supplying the toner into a developing chamber 37. The agitator 36 has a coarse mesh-like plate shape extending in an axial direction (near-to-far direction in FIG. 1) of a rotating shaft 35 and has a bend in the middle when viewed as a cross-section. The agitator 36 is rotatable about an axis of the rotation shaft 35 in a direction indicated by an arrow in FIG. 1. Film members 36a for scraping the inner wall of the toner hopper 34 are provided on a free end portion and an intermediate bent portion of the agitator 36. The film members 35 are in sliding contact with the inner wall surface of the toner hopper 34 when the agitator 36 is rotated in the direction indicated by the arrow. Thus, toner accommodated in the toner hopper 34 is agitated and supplied to the toner supply roller 33.

A transfer roller 30 is disposed below the photosensitive drum 27 and downstream from the developing roller 31 with respect to the rotating direction of the photosensitive drum 27. The transfer roller 30 is rotatable counterclockwise as indicated by an arrow in FIG. 1. The transfer roller 30 includes a metal roller shaft coated with a roller made from an ion-conductive rubber material. During the transfer process, a transfer bias circuit unit (not shown) of the high-voltage power source 95 applies a transfer forward bias to the transfer roller 30. The transfer forward bias generates a potential difference between the surfaces of the photosensitive drum 27 and the transfer roller 30. The potential difference electrically attracts toner that has been electrostatically clinging to the surface of the photosensitive drum 27 toward the surface of the transfer roller 30.

It should be noted that the laser printer 1 employs what is known as a cleanerless developing system, in which the developing roller 31 recovers residual toner remaining on a surface of the photosensitive drum 27 after the transfer roller 30 transfers toner from the photosensitive drum 27 to the sheet 3.

The fixing device 18 in the image forming section is disposed downstream from the process cartridge 17 with respect to the direction of sheet transport. The fixing device 18 includes a heat roller 41, a pressure roller 42 for pressing the heat roller 41, and a pair of conveying rollers 43. The conveying rollers 43 are provided downstream from the heat roller 41 and the pressure roller 42. The heat roller 41 is formed by coating a hollow aluminum tube with a fluorocarbon resin and sintering the assembly. The heat roller 41 includes a halogen lamp 41a for heating inside the metal tube. The pressure roller 42 includes a silicon rubber shaft having low hardness, and tubular member covering the rubber shaft and formed of a fluorocarbon resin. The silicon rubber shaft is urged upward by a spring (not shown), pressing the pressure roller 42 against the heat roller 41. While the sheet 3 from the process cartridge 17 passes between the heat roller 41 and the pressure roller 42, the heat roller 41 pressurizes and heats toner image that was transferred onto the sheet 3 in the process cartridge 17, thereby fixing the toner onto the sheet 3. Afterward, the sheet 3 is transported to the sheet discharge path 44 by the conveying rollers 43.

Figure 2:
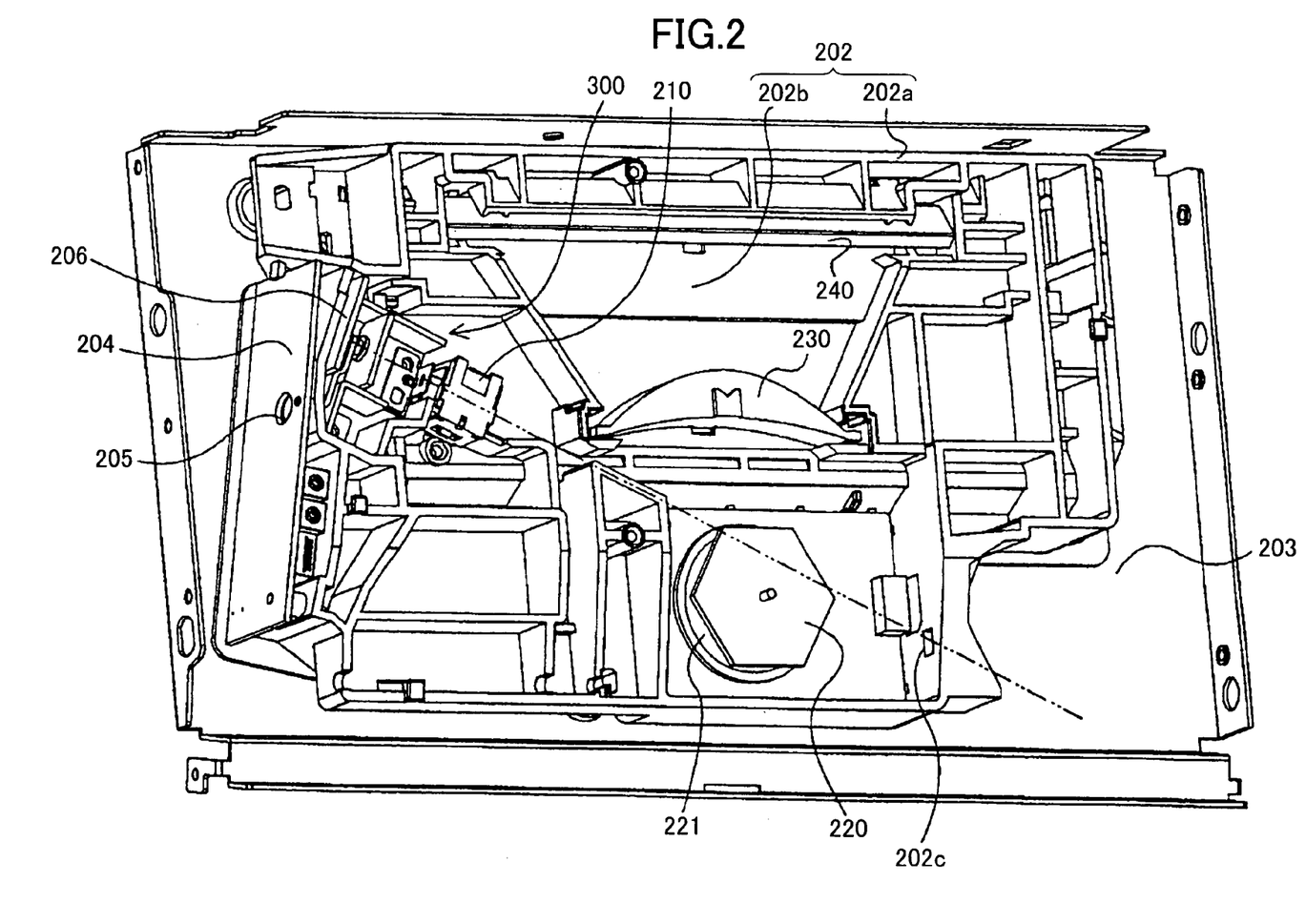
FIG. 2 is a perspective view of the scanner unit according to the embodiment and viewed from the top with a top cover member being removed.
Figure 3:
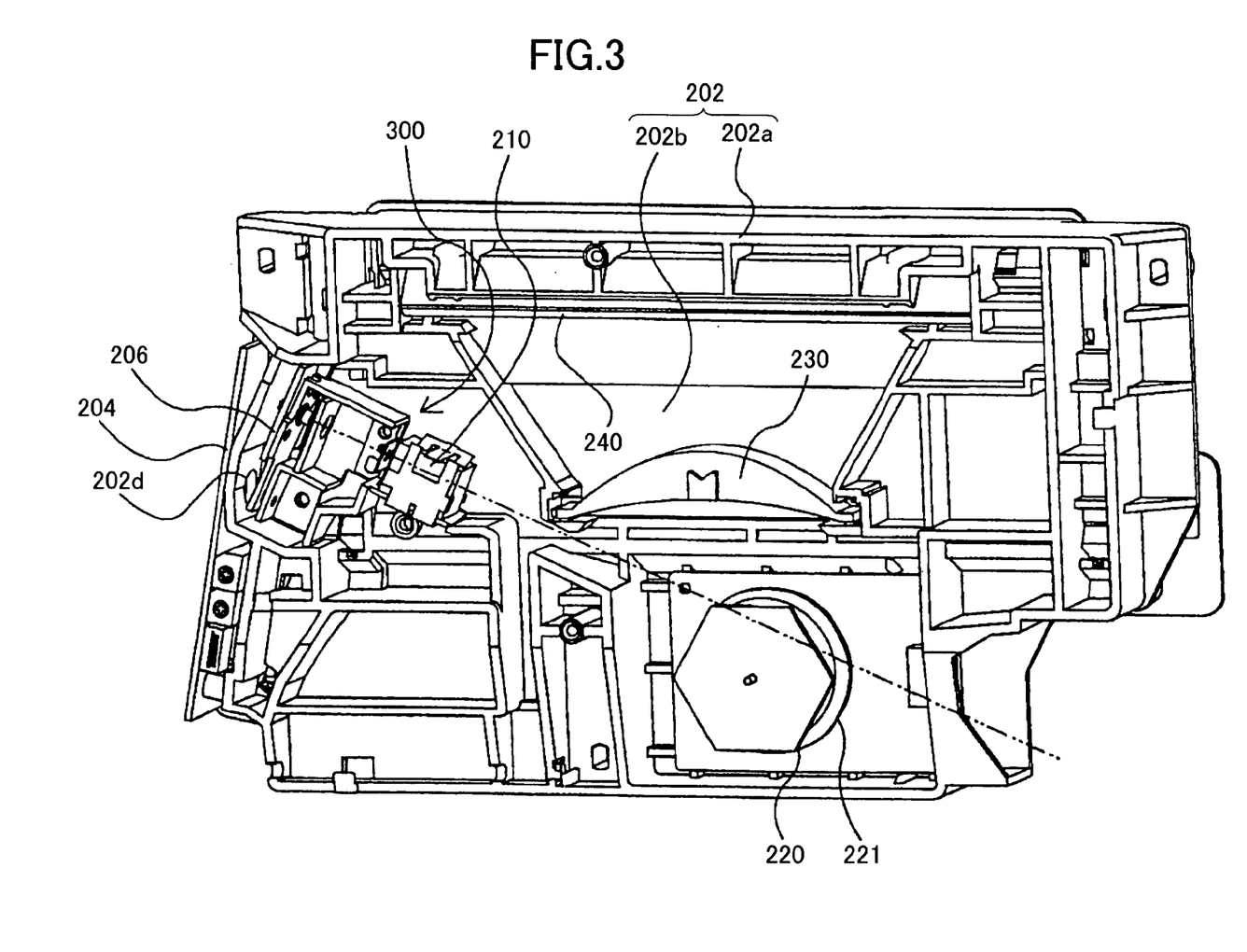
FIG. 3 is a perspective view of the scanner unit as viewed from the top at an angle different from that in FIG. 2 with the top cover member being removed.

Referring now to FIGS. 1 through 3, will be described the scanner unit 200 as an optical scanning device. As shown in FIG. 1, the body of the scanner unit 200 includes a scanner frame 202, a cover member 201 and a tray 203. The scanner frame 202 is made of resin mixed with reinforcement agent such as glass fiber and the like. The cover member 201 is adapted for covering an upper open end of the scanner frame 202, and is made of iron. The tray 203 is made of a steel plate that supports the bottom of the scanner frame 202 and is fixed between right and left body frames by screws.

As shown in FIG. 2, the tray 203 is in the form of a shallow box by bending four sides of a substantially rectangular plate in the same direction. An extending direction of short sides of the box-shaped tray 203 is directed in frontward rearward direction of the laser printer 1. Two holes for screwing are formed at both short side bent portions so that the tray 203 can be bridged and fixed between right and left body frames (not shown). That is, the major sides of the tray 203 extend in the transverse direction of the laser printer. An elongated opening 203a (see FIG. 1) extending in the major sides is formed at a substantial center of the tray 203. The scanner frame 202 includes an external wall 202a and a partition wall 202b. The external wall 202a surrounds a range slightly smaller than the bottom of the tray 203 in a substantially rectangular shape having a partial notch and is provided almost perpendicularly to the bottom of the tray 203. Inside the area surrounded by the external wall 202a, the partition wall 202b extends horizontally from a vertically middle portion of the external wall 202a for dividing a space defined by the external wall 202a into an upper space and a lower space.

A cylindrical lens 210 is provided at one longitudinal end of the scanner frame 202 and adjacent to the laser unit 300 in the upper space of the scanner frame 202 above the partition wall 202b. The cylindrical lens 210 vertically refracts a laser beam irradiated from the laser unit 300 and focuses the laser beam on the polygon mirror 220. The polygon mirror 220 and an fθ lens 230 are positioned at one short side end of the scanner frame 202. The polygon mirror 220 is a rotating multifaceted mirror having six mirrors on a rotatable hexagonal body for horizontally scanning a laser beam focused on the mirror surface. When the laser beam is reflected on the polygon mirror 220 and is scanned at a constant angular velocity, the fθ lens 230 converts the laser beam into the beam of constant speed scanning. At the other end of the short side of the scanner frame 202, a mirror 240 is provided for reflecting and relaying the laser beam which has been passing through the fθ lens 230 toward the lower space of the scanner frame 202 below the partition wall 202b.

As shown in FIG. 1, the lower space of the scanner frame 202 accommodates therein a mirror 250, a cylindrical lens 260, and a mirror 270. The mirror 250 reflectingly directs the laser beam relayed by the mirror 240 to the inside of the scanner frame 202. The cylindrical lens 260 vertically refracts a flux of laser beams for correcting surface misalignment of the polygon mirror 220. The mirror 270 reflects the laser beam passing through the cylindrical lens 260 to let the laser beam out of the scanner unit 200 through the aperture 203a of the tray 203 and focus the laser beam on the surface of a photosensitive drum 27.

As shown in FIGS. 2 and 3, a motor 221 and a circuit substrate 204 are provided on an external wall surface of the scanner frame 202 assembled with the laser unit 300. The motor 221 serves as a drive means for rotationally driving the polygon mirror 220. The circuit substrate 204 is adapted for adjusting laser beam outputs from the laser unit 300. An adjusting hole 205 is formed in the circuit substrate 204, and a through-hole 202d coaxial with the adjusting hole 205 is formed in an external wall of the scanner frame 202. These holes allow a screwdriver or the like to be inserted therethrough for the optical axis adjustment of the laser unit 300 to be described later. An inspection hole 202c is formed in a wall of the scanner frame 202 at a position approximately coaxial with the optical axis (indicated by the chain double-dashed line in FIG. 2) for inspecting the optical axis of the laser beam to be irradiated to the polygon mirror 220 from the LD 350.

Details of the polygon mirror 220 will next be described with reference to FIGS. 4 through 6. As shown in FIG. 5, the polygon mirror 220 includes six reflection surfaces 222 to form a hexagonal shape. Each reflection surface 222 has a rectangular writing region 223 at which the light beam is reflected for forming the electrostatic latent image on the surface of the photosensitive drum 27 (FIG. 1). Each reflection surface 222 also has non-writing regions 224, 224' each positioned at each short side end portion of each reflection surface 222 and beside each end of the writing region 223. The light beam not available for forming the electrostatic latent image on the surface of the photosensitive drum 27 is reflected at the non-writing regions 224, 224'. Further, the writing region 223 is divided into a first reflecting section 225 having a first reflection factor and a second reflecting section 226 having a second reflection factor lower than the first reflection factor.

In order to provide the difference in reflection factor, the first reflecting section 225 has a first coating layer, and the second reflecting section 226 has a second coating layer, and a thickness of the first coating layer is smaller than that of the second coating layer. In order to make the second reflection factor lower than the first reflection factor, at least one of the state of the light beam, wavelength, and incident angle of the light beam into the reflection surface 222 is selected. For example, polarizing direction (either P-polarization or S-polarization) relative to the polygon mirror 220 of the light beam emitted from the laser unit 300 is the example of the state of the light beam, and the position of the polygon mirror 220 relative to the laser unit 300 determines the incident angle.

To be more specific, the material of the coating layer is $SiO_2$, and thickness of the first and second coating layers is 48.2 nm, and 93.5 nm, respectively. With this arrangement, the laser beam provides p-polarization with the wavelength of 780 nm while rotating the polygon mirror 220 (motor 221) in the counterclockwise direction. Incidentally, one of the non-writing region 224 at the side of the first reflecting section 225 has the the side of the first reflecting section 225 has the first reflection factor equal to that of the first reflecting section 225. In other words, the non writing region 224 has a coating layer whose thickness is the same as that of the first coating layer. Similarly, remaining one of the non-writing region 224' at the side of the second reflecting section 226 has the second reflection factor equal to that of the second reflecting section 226. In other words, the non writing region 224' has a coating layer whose thickness is the same as that of the second coating layer.

As shown in FIG. 5, in each reflection surface 222, the first reflecting section 225 is positioned upstream of the second reflecting section 226 in the rotating direction of the polygon mirror 220. Further, a fog as shown by a cross-hatching region 227 tends to be generated at the upstream side of each reflection surface 222. However, the foggy region 227 is at the first reflecting section 225, and the first reflecting section 225 provides the higher reflection factor than the second reflecting section 226. Therefore, the foggy region 227 can also be utilized for the part of the writing region 223.

Figure 4:
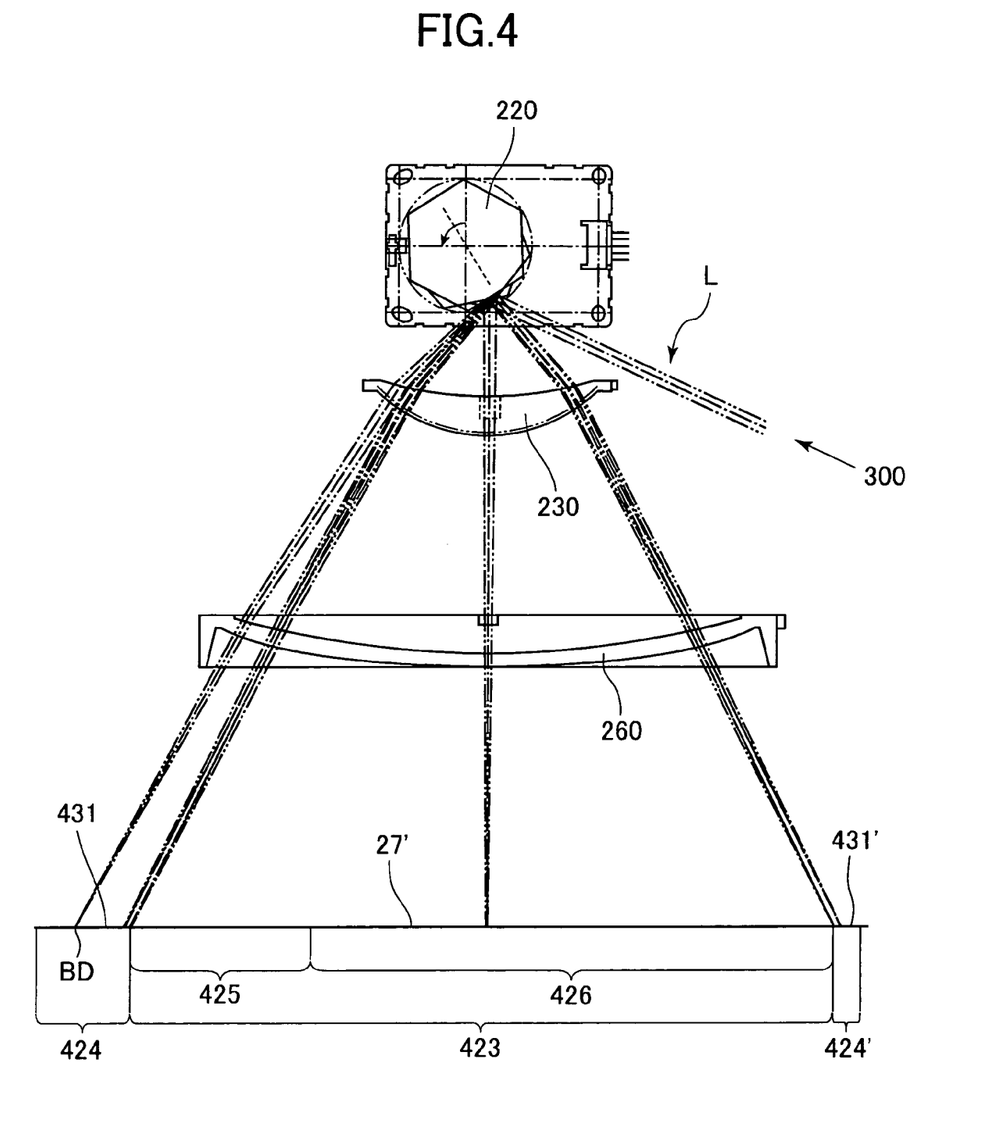
FIG. 4 is a schematic illustration showing a distribution of laser beam reflected at a polygon mirror according to the first embodiment of the present invention.
Figure 5:
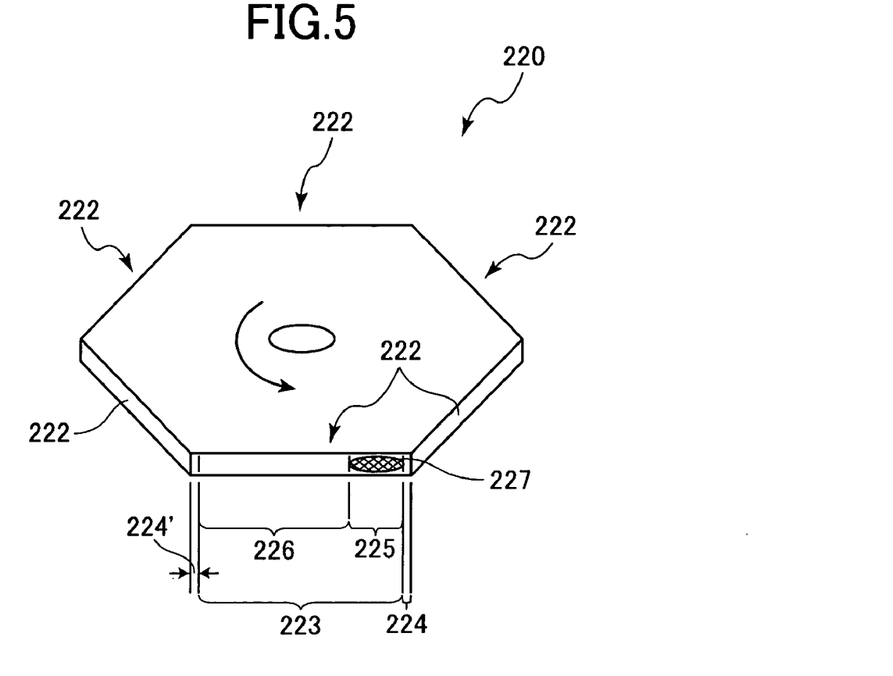
FIG. 5 is an enlarged perspective view showing the polygon mirror according to the first embodiment.

In FIG. 4, as a matter of convenience, reflection mirrors 240, 250 and 270 those disposed between the polygon mirror 220 and the photosensitive drum 27 in the optical path are omitted. As shown in FIG. 4 the light beam L reflected at the writing region 223 of the reflection surface 222 is irradiated on a region 423 of the surface of the photosensitive drum 27 to form the electro-static latent image thereon. On the other hand, the light beam reflected at the non writing regions 224, 224' of the reflection surface 222 is irradiated on neighboring regions 424, 424' of the surface of the photosensitive drum 27. Further, the light beam L reflected at the first reflecting section 225 of the writing region 223 is irradiated on a region 425 of the surface of the photosensitive drum 27, and the light beam L reflected at the second reflecting section 225 of the writing region 226 is irradiated on a region 426 of the surface of the photosensitive drum 27. In FIG. 4, right and left edges of the sheet 3 are superposed with portions 431, 431' on the surface of the photosensitive drum 27. That is, margins are provided at the right and left edge portions of the sheet 3, because the portions 431, 431' are within the regions 424, 424'.

As shown in FIG. 4, a beam detector BD is provided at the region 424 for detecting the light beam reflected at the non-writing region 224 for generating a synchronization signal. The synchronization signal is used for rotating the polygon mirror 220 in synchronization with the rotations of the photosensitive drum 27 and the registration roller 12. Incidentally, regarding a configuration of a beam spot of the light beam L directed to the reflection surface 222, a length in a main scanning direction (left and right direction in FIG. 4 is greater than a length in an auxiliary scanning direction (in a direction perpendicular to a sheet of FIG. 4).

Figure 6:
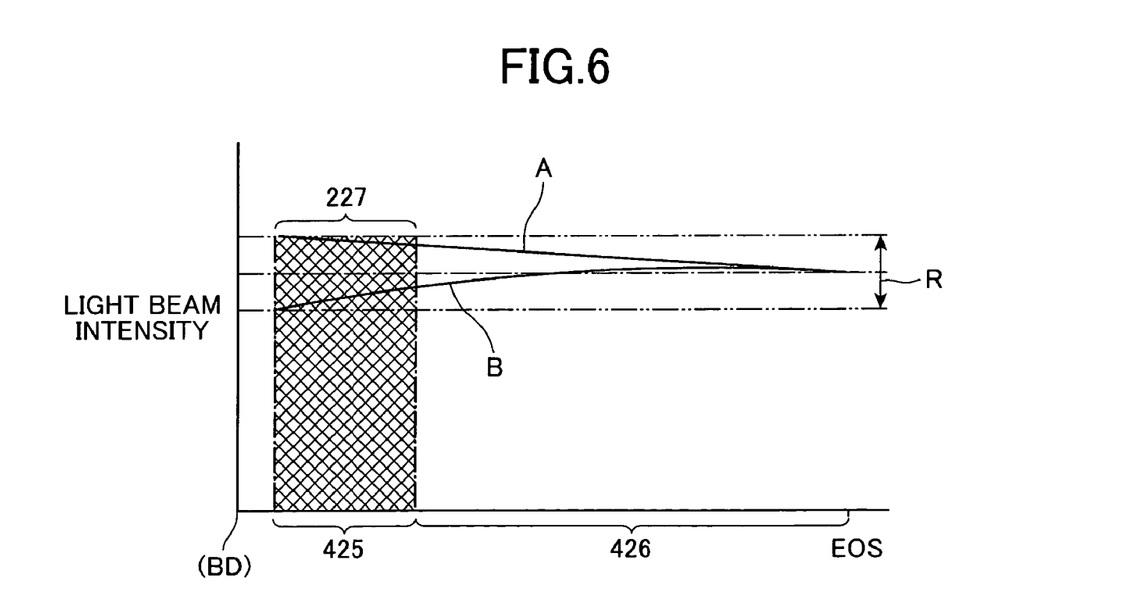
FIG. 6 is a graphical representation showing the relationship between light beam power on a surface of a photosensitive drum and a scanning position thereon.

FIG. 6 shows the light beam intensity on the surface of the photosensitive drum 27 with respect to the scanning position of the light beam thereon. In FIG. 6 an abscissa represents the scanning position, and an ordinate represents the light beam intensity. A right side area in FIG. 6 corresponds to the region 426 which corresponds to the light irradiation area formed by the reflection from the second reflecting section 226. In FIG. 6, EOS implies end of scan at the downstream end in the rotational direction, i.e., at the right end of the region 426 in FIG. 4. On the other hand, a left side area in FIG. 6 corresponds to the region 425 which corresponds to the light irradiation area formed by the reflection from the first reflecting section 225.

A tolerable range R is defined in FIG. 6. The tolerable range R implies the range of the light beam intensity capable of providing a desirable electrostatic latent image on the photosensitive drum 27. In FIG. 6, a curve A stands for light beam intensity at an initial using phase of the polygon mirror 220, and a curve B stands for light beam intensity at a terminal using phase (after expiration of service life) of the polygon mirror 220.

The first and second light reflecting sections 225 and 226 are so constructed that the light beam intensity in the region 426 is within the tolerable range R, and the light beam intensity in the region 425 is also within the tolerable range R irrespective of the foggy area 227 in the first light reflecting section 225. To be more specific, the first and second light reflecting sections 225 and 226 are so constructed that (a) with reference to the curve A, the light beam intensity at the region 425 corresponding to the first reflecting section 225 provides an uppermost level in the tolerable range R at the time of initial using phase of the polygon mirror 220, and the light beam intensity at the region 426 corresponding to the second reflecting section 226 provides an intermediate level in the tolerable range R at the time of initial using phase of the polygon mirror 220, and (b) with reference to the curve B, the light beam intensity at both the regions 425 and 426 are within the tolerable range R at the time of terminal using phase of the polygon mirror 220, even though the light beam intensity of at the region 425 is lowered due to the generation of foggy area 227.

In operation, a stack of paper is placed on the paper pressing plate 7 of the paper cassette 6. An uppermost paper 3 of paper stack is urged from the rear of the paper pressing plate 7 toward the sheet supply roller 8 by the biasing force of the coil spring 7b. A print operation starts upon reception of print data from a host computer (not shown). At this time, the paper 3 is fed by a frictional force applied from the sheet supply roller 8 and is nipped between the sheet supply roller 8 and the separation pad 9. After separated from the stack of paper, the paper 3 is transported to the registration roller 12.

In the scanner unit 200, a light source such as LD of the laser unit 300 irradiates laser beams based on a laser drive signal generated from the engine circuit board 85. A collimator lens (not shown) collimates the laser beams into almost parallel rays. Thereafter, a slit hole (not shown) formed in the laser unit 300 regulates a spread of laser beams. The cylindrical lens 210 vertically refracts the laser beams to be focused on the polygon mirror 220. The polygon mirror 220 horizontally scans the laser beam when reflecting the laser beam and allows the laser beam to be incident on the fθ lens 230. The laser beam scanned at a constant angular velocity by the polygon mirror 220 is converted into constant speed scanning by the fθ lens 230. After the laser beam is reflected on the mirrors 240 and 250, the cylindrical lens 260 corrects vertical surface misalignment due to the polygon mirror 220. The laser beam is focused on the surface of the photosensitive drum 27 via the mirror 270.

A surface potential of the photosensitive drum 27 becomes approximately 1000V by the scorotron charger 29. Then, the photosensitive drum 27 is exposed to the laser beam during rotation in the arrow direction (clockwise in the drawing). On a main scanning line on the photosensitive drum 27, the laser beam is irradiated to a portion to be developed and is not irradiated to a portion not to be developed. The irradiated portion (bright portion) decreases its surface potential down to approximately 200V. Since the photosensitive drum 27 rotates, the laser beam is also irradiated in an auxiliary scanning direction (the direction of transporting the paper 3). Thus, the dark portion and the bright portion form an electrical invisible image, i.e., an electrostatic latent image on the surface of the photosensitive drum 27.

The agitator 36 rotates to supply a toner in the toner hopper 34 to the toner supply roller 33. The toner supply roller 33 rotates to supply the toner to the developing roller 31. At this time, the toner is positively frictionally-charged between the toner supply roller 33 and the developing roller 31. The toner is further adjusted to be a thin layer of a specified thickness and is mounted on the developing roller 31. The developing roller 31 is applied with a positive bias of substantially 400 V. As mentioned above, the toner is mounted on the developing roller 31 and is positively charged. When the developing roller 31 rotates to allow the toner to contact with the opposite photosensitive drum 27, the toner is transferred to the electrostatic latent image formed on the surface of the photosensitive drum 27. The potential of the developing roller 31 is lower than the dark portion's potential (+1000 V) and is higher than the bright portion's potential (+200 V). Consequently, the toner is selectively transferred to low-potential bright portions. In this manner, a visible toner image is formed and developed as a developer image on the surface of the photosensitive drum 27.

The registration roller 12 performs sheet registration. That is, the registration roller 12 releases the paper 3 when the leading edge of the paper 3 reaches the leading edge of the visible image formed on the surface of the rotating photosensitive drum 27. When the paper 3 passes between the photosensitive drum 27 and a transfer roller 30, the transfer roller 30 is applied with a negative constant voltage so that the potential of the transfer roller 30 becomes much lower (e.g., −1000 V) than the bright portion's potential (+200 V). In this manner, the visible image formed on the surface of the photosensitive drum 27 is transferred to the paper 3.

The paper 3 carrying the toner image is transported to the fixing unit 18. In the fixing unit 18 the heat roller 41 applies a heat of approximately 200° C. to the toner-carrying paper 3 and the press roller 42 applies pressure to the paper 3. The toner is welded on the paper 3 to form a permanent image. The heat roller 41 and the pressure roller 42 are grounded via diodes. It is configured that a surface potential of the pressure roller 42 becomes lower than that of the heat roller 41. Therefore, the positively charged toner mounted on one side of the paper 3, the one side being in confrontation with the heat roller 41, can be electrically absorbed to the pressure roller 42 through the paper 3. This prevents the image from being degraded due to unwanted transfer of the toner to the heat roller 41 during fixing operation.

After the toner is pressed, heated, and fixed to the paper 3, the paper 3 is ejected from the fixing unit 18 by the transport roller 43. The paper 3 is transported along the paper ejection path 44 and is ejected with its printed side down to the discharge tray 46 by the discharge roller 45. The subsequent paper 3 to be printed next is likewise stacked with its printed side down on the previously ejected paper 3 in the discharge tray 46. In this manner, a user can obtain printed papers 3 that are stacked in the order of printing.

According to the first embodiment, as described above, the foggy region 227 is also used as a part of the writing region 223. Therefore, a compact polygon mirror 220 can result. To this effect, the first and second reflecting sections 225 and 226 are provided in the writing region 223, the first reflecting section 225 is positioned at upstream of the second reflecting section 226 in the rotating direction of the polygon mirror 220, the reflection factor of the first reflecting section 225 is higher than that of the second reflecting section 226, and the foggy region 227 is positioned in the first reflecting section 225. Because the first and second reflecting sections 225 and 226 provide the light beam intensity within the tolerable range R, resultant electrostatic latent image over the regions 425 and 426 provides uniform quality. Consequently, a desirable visible image can be formed on the sheet 3.

Further, because of the light beam intensity distribution shown in FIG 6, quality of the electrostatic latent image formed as a result of reflection at the first reflecting section 225 is not lower than that as a result of reflection at the second reflecting section 226 despite of the formation of the foggy region 227, but resultant electrostatic latent image can provide even quality over the regions 425 and 426. Moreover, because of the curves A and B, Further, because the light beam intensity at the initial using phase of the polygon mirror 220 is set at the highest level in the region 425 corresponding to the first reflecting section 225, the light beam intensity at the terminal using phase of the polygon mirror 220 can still be within the tolerable range R in the region 425. Consequently, even if foggy region 227 is generated as a result of long period of use at the first reflecting section 225, the first reflecting section 225 can still provide the desirable light beam intensity within the tolerable range R.

In summary, a compact polygon mirror can result because the fog generating region is utilized as a part of the writing region. Further, even if the fog generating region is set within the writing region in each light reflection surface, the corresponding electrostatic latent image portion formed by the light beam reflected at the fog generating region can still provide an imaging quality the same as that of the remaining portion of the electrostatic latent image.

Furthermore, as described above, the length of the beam spot in the main scanning direction is made longer than the length in the auxiliary scanning direction. Therefore, there is a high probability in that a beam spot of the light beam incident onto the reflection surface 222 can intersect the boundary between the first and second reflecting sections 225 and 226. In other words, there is a less probability in that the shorter side of the beam spot becomes aligned with the boundary. Consequently, stepwise change in the light beam intensity distribution due to the coincidence with the boundary with the short side of the beam spot can be avoided.

Figure 7:
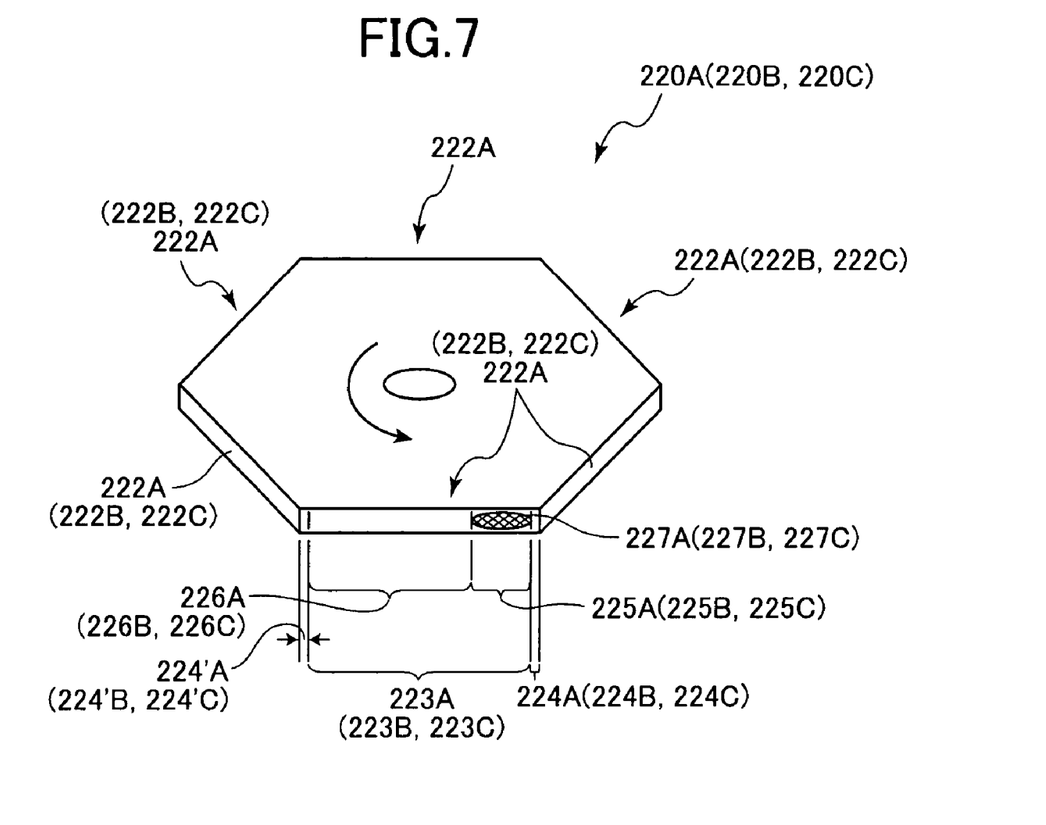
FIG. 7 shows a polygon mirror according to another embodiment.

Polygon mirrors according to second through fourth embodiments of the present invention will be described with reference to FIG. 7, wherein like portions are designated by the same reference numerals as those shown in FIG. 5, but "A", "B", and "C" are added to each reference numeral appearing in the first embodiment for designating the second through fourth embodiments while showing the correspondence.

A polygon mirror 220A of the second embodiment is substantially the same as the polygon mirror 220 of the first embodiment except the thickness of first and second coating layers coated on first and second reflecting section 225A, 226A, respectively. That is, like the first embodiment, the second embodiment has the first reflecting section 225A having a first reflection factor and the second reflecting section 226A having a second reflection factor lower than that of the first reflecting section 225A in each writing region 223A of each reflection surface 222A of the polygon mirror 220A. To this effect, a first coating layer of the first reflecting section 225A has a thickness greater than that of a second coating layer of the second reflecting section 226A, and the light beam applied to each reflection surface 222A of the polygon mirror 220A provides a state different from that of the light beam in the first embodiment. That is, s-polarization is applied in the second embodiment. The light beam intensity distribution curves A and B shown in FIG. 6 is also available in the second embodiment.

A polygon mirror 220B of the third embodiment is substantially the same as the polygon mirrors 220, 220A of the first and second embodiments. However, in the first and second embodiments, attention is drawn to thickness of the first and second coating layers, whereas in the third embodiment, attention is drawn to refractive index of the first and second coating layers.

Like the first and second embodiment, the third embodiment has the first reflecting section 225B having a first reflection factor and the second reflecting section 226B having a second reflection factor lower than that of the first reflecting section 225A in each writing region 223B of each reflection surface 222B of the polygon mirror 220B. To this effect, the first coating layer of the first reflecting section 225B has the first coating layer which provides a first refractive index, and the second coating layer of the second reflecting section 226B has the second coating layer which provides a second refractive index higher than that of the first coating layer.

The light beam intensity distribution curves A and B shown in FIG. 6 is also available in the third embodiment. Incidentally, one of the non-writing regions 224B has a coating layer whose refractive index is the same as that of the first coating layer, and the other non-writing region 225'B has a coating layer whose refractive index is the same as that of the second coating layer.

A polygon mirror 220C of the fourth embodiment is substantially the same as the polygon mirrors 220B of the third embodiment, except for the refractive indices of the first and second coating layers. Like the first through third embodiments, the fourth embodiment has a first reflecting section 225C having a first reflection factor and the second reflecting section 226C having a second reflection factor lower than that of the first reflecting section 225C in each writing region 223C of each reflection surface 222C of the polygon mirror 220C. To this effect, the first coating layer of the first reflecting section 225C has the first coating layer which provides a first refractive index, and the second coating layer of the second reflecting section 226C has the second coating layer which provides a second refractive index lower than that of the first coating layer. The light beam intensity distribution curves A and B shown in FIG. 6 is also available in the fourth embodiment.

While the invention has been described in detail with reference to specific embodiments thereof, it would be apparent to those skilled in the art that various changes and modifications may be made therein without departing from the spirit and scope of the invention.

What is claimed is:

1. A polygon mirror rotatable about its axis in a rotating direction for use in an image forming device including a photosensitive body, the polygon mirror comprising:
a plurality of reflection surfaces at which a light beam is reflected toward the photosensitive body, each reflection surface including a writing region available for forming an electrostatic latent image on the photosensitive body and a non-writing region unavailable for forming the electrostatic latent image, the writing region being divided into a first reflecting section having a first reflection factor and a second reflecting section having a second reflection factor lower than the first reflection factor.

2. The polygon mirror as claimed in clam 1, wherein a foggy region is generated in each reflection surface as a result of continued operation, and wherein the first reflecting section is encompassed to cover the foggy region.

3. The polygon mirror as claimed in claim 1, wherein the first reflecting section has a first coating layer and a second reflecting section has a second coating layer whose thickness is different from that of the first coating layer.

4. The polygon mirror as claimed in claim 1, wherein the first reflecting section has a first coating layer providing a first refractive index, and a second reflecting section has a second coating layer providing a second refractive index different from the first refractive index.

5. The polygon mirror as claimed in claim 1, wherein the first reflecting section is positioned upstream of the second reflecting section in the rotating direction.

6. The polygon mirror as claimed in claim 5, wherein the first reflecting section has a first coating layer and a second reflecting section has a second coating layer whose thickness is different from that of the first coating layer.

7. The polygon mirror as claimed in claim 6, wherein the non-writing region comprises a first non-writing region positioned upstream of the first reflecting section in the rotating direction, and a second non-writing region positioned down-stream of the second reflecting section in the rotating direction.

8. The polygon mirror as claimed in claim 7, wherein the first non-writing region has a coating layer whose thickness is equal to that of the first coating layer, and the second non-writing region has a coating layer whose thickness is equal to that of the second coating layer.

9. The polygon mirror as claimed in claim 5, wherein the first reflecting section has a first coating layer providing a first refractive index, and a second reflecting section has a second coating layer providing a second refractive index different from the first refractive index.

10. The polygon mirror as claimed in claim 9, wherein the non-writing region comprises a first non-writing region positioned upstream of the first reflecting section in the rotating direction, and a second non-writing region positioned down-stream of the second reflecting section in the rotating direction.

11. The polygon mirror as claimed in claim 10, wherein the first non-writing region has a coating layer whose refractive index is equal to that of the first coating layer, and the second non-writing region has a coating layer whose refractive index is equal to that of the second coating layer.

12. The polygon mirror as claimed in claim 1, wherein each writing region of each reflection surface provides a tolerable light beam intensity including an upper limit and a lower limit, and
wherein the first reflecting section provides the light beam intensity substantially equal to the upper limit during an initial using period; and
wherein the second reflecting section provides an intermediate light beam intensity between the upper and lower limits during an initial using period.

13. The polygon mirror as claimed in claim 12, wherein the first reflecting section is positioned upstream of the second reflecting section in the rotating direction.

14. The polygon mirror as claimed in claim 13, wherein the first reflecting section has a first coating layer and a second reflecting section has a second coating layer whose thickness is different from that of the first coating layer.

15. The polygon mirror as claimed in claim 14, wherein the non-writing region comprises a first non-writing region positioned upstream of the first reflecting section in the rotating direction, and a second non-writing region positioned down-stream of the second reflecting section in the rotating direction.

16. The polygon mirror as claimed in claim 15, wherein the first non-writing region has a coating layer whose thickness is equal to that of the first coating layer, and the second non-writing region has a coating layer whose thickness is equal to that of the second coating layer.

17. The polygon mirror as claimed in claim 13, wherein the first reflecting section has a first coating layer providing a first refractive index, and a second reflecting section has a second coating layer providing a second refractive index different from the first refractive index.

18. The polygon mirror as claimed in claim 17, wherein the non-writing region comprises a first non-writing region positioned upstream of the first reflecting section in the rotating direction, and a second non-writing region positioned down-stream of the second reflecting section in the rotating direction.

19. The polygon mirror as claimed in claim 18, wherein the first non-writing region has a coating layer whose refractive index is equal to that of the first coating layer, and the second non-writing region has a coating layer whose refractive index is equal to that of the second coating layer.

20. The polygon mirror as claimed in claim 1, wherein the light beam provides, on each reflection surface, a beam spot having a first length in a main scanning direction which is equal to a direction of an array of the first reflecting section and the second reflecting section, and a second length in an auxiliary scanning direction perpendicular to the main scanning direction, the first length being greater than the second length.

21. An optical scanning device for use in an image forming device including a photosensitive body, the optical scanning unit comprising:
 a light beam emitting unit for emitting a light beam;
 a polygon mirror for reflecting the light beam emitted from the light beam emitting unit; and
 a driving unit for rotating the polygon mirror about its axis, the polygon mirror including a plurality of reflection surfaces at which the light beam is reflected toward the photosensitive body, each reflection surface including a writing region available for forming an electrostatic latent image on the photosensitive body and a non-writing region unavailable for forming the electrostatic latent image, the writing region being divided into a first reflecting section being divided into a first reflecting section having a first reflection factor and a second reflecting section having a second reflection factor lower than the first reflection factor.

22. An image forming device for forming an image on an image recording medium comprising:
 an image forming unit comprising a photosensitive body on which an electrostatic latent image is formed; and
 an optical scanning device comprising:
  a light beam emitting unit for emitting a light beam;
  a polygon mirror for reflecting the light beam emitted from the light beam emitting unit; and
  a driving unit for rotating the polygon mirror about its axis, the polygon mirror including a plurality of reflection surfaces at which the light beam is reflected toward the photosensitive body, each reflection surface including a writing region available for forming the electrostatic latent image on the photosensitive body and a non-writing region unavailable for forming the electrostatic latent image, the writing region being divided into a first reflecting section having a first reflection factor and a second reflecting section having a second reflection factor lower than the first reflection factor.

* * * * *